Patented Jan. 13, 1942

2,270,175

UNITED STATES PATENT OFFICE 2,270,175

ORGANIC PEROXIDE

Harco Jacob Tadema, Amsterdam, Netherlands, assignor to Shell Development Company, San Francisco, Calif., a corporation of Delaware No Drawing. Application February 8, 1940, Serial No. 317,898. In the Netherlands January 26, 1939

19 Claims. (Cl. 260—593)

This invention relates to novel and useful organic peroxide mixtures, as well as to a process for their preparation. In one of its more specific embodiments, the invention is also concerned with a class of new organic peroxides or organic peroxide-containing mixtures formed by reaction, in an acid medium, and preferably in a sulfuric acid medium, of an aliphatic ketone with a product formed by the incomplete combustion of a hydrocarbon, particularly an aliphatic saturated or unsaturated hydrocarbon.

The preparation of organic peroxides by reaction of hydrogen peroxide with ketones, aldehydes, dialkyl sulfates, acid anhydrides, acid chlorides and the like is well known. With ketones and aldehydes, the reaction has been carried out in the presence of strong acids, such as hydrochloric and particularly sulfuric acids, while maintaining a low temperature. So-called dimeric ketone peroxide, such as acetone peroxide, has also been prepared by reacting permonosulfuric or Caro's acid (H₂SO₅) with a solution of acetone in ether. Another known method of preparing ketone peroxides consists in first subjecting a solution of persulfuric acid or a preferably acidified solution of a persulfate to a hydrolytic treatment, thereby liberating free hydrogen peroxide and possibly some permonosulfuric acid. Thereafter, without removing these hydrolysis products, the partially hydrolyzed persulfate radical-containing solution is then reacted with the ketone, preferably at a low temperature. The ketone peroxides thus formed may be removed, for example by extraction with a suitable solvent, the remaining reaction mixture being then usable for the further preparation of organic peroxides. It has been also proposed to prepare ketone and aldehyde peroxides by carrying out the oxidation of these organic compounds with hydrogen peroxide or substances capable of forming hydrogen peroxides in the presence of water and sulfuric acid, the sulfuric acid being employed in a concentration of from 40% to 65% by weight of the mixture of the oxidizing agent, water and sulfuric acid.

The ketone or aldehyde peroxides produced by the above outlined known processes may be either homopolymeric or heteropolymeric. For example, when an acetone is used as the initial reactant, a reaction product is obtained which consists of a mixture of dimeric and trimeric acetone peroxides. Similar homopolymeric ketone peroxides are known to result from treatment of a higher ketone. Aldehydes act in a like manner, benzaldehyde, for instance, having been treated with hydrogen peroxide in the presence of sulfuric acid to produce a homopolymeric benzaldehyde peroxide. On the other hand, heteropolymeric peroxides may be produced by oxidizing a mixture of dissimilar carbonylic compounds in any known manner which is conducive to the formation of peroxides, as, for example, by subjecting the mixture of dissimilar ketones, dissimilar aldehydes, or mixtures of a ketone and an aldehyde, in an acid medium, to the oxidizing action of hydrogen peroxide, hydrolyzed persulfuric acid, or Caro's acid (H₂SO₅).

Both the homopolymeric and heteropolymeric peroxides mentioned herein are valuable materials which may be used for various purposes. Their powerful oxidizing character makes them useful to bleach flour, textile materials, paper, and the like. They may also be applied in the manufacture of synthetic products such as pharmaceutical preparations. They are, however, particularly effective as ignition promoters for use with liquid fuels for compression ignition, i. e. Diesel and semi-Diesel engines, the addition of even very small percentages of these ketone peroxides, or the like, markedly increasing the cetane number of the Diesel and/or semi-Diesel engine fuels. The term "cetane number," as relating to a given fuel, is the percentage by volume of cetane (C₁₆H₃₄) in a mixture with alpha-methyl-naphthalene, which is equivalent in ignition to the given fuel.

Although ketone peroxides and aldehyde peroxides are effective as ignition promoters when added to Diesel and semi-Diesel engine liquid fuels, they have been applied industrially on only a limited scale because of the relatively high price of the hydrogen peroxide normally employed for their manufacture, the resulting high cost of production of such organic peroxides by the known methods, and their explosiveness and inflammability. This relatively limited use of these ketone peroxides and/or aldehyde peroxides is also due to the fact that there are other substances or compounds which possess oxidizing and/or ignition promoting characteristics similar to those of the peroxides, but which compounds are non-explosive or relatively less dangerous in handling. For example, certain organic nitrates, such as amyl nitrates, have been used as ignition promoters in Diesel engine fuels in preference to ketone peroxides although both types of compounds affect the cetane number of the fuel to substantially the same degree. Even peroxy-pyrophosphate compounds of formaldehyde, and the like, have been employed as substitutes for ketone and aldehyde peroxides primarily because these peroxy-pyrophosphate compounds are non-explosive. It is to be noted that such substitution has been made heretofore in spite of the fact that, because of their inorganic content these peroxy-pyrophosphate compounds of formaldehyde are less desirable for most of the purposes for which aldehyde and ketone peroxides are particularly adapted.

It has now been discovered that aliphatic ketone peroxides and mixtures containing such peroxides may be prepared by reacting the aliphatic ketones, in an aqueous acid medium, with products of partial or incomplete combustion of aliphatic, saturated and/or unsaturated hydrocarbons. It has been further discovered that the aldehyde and aliphatic ketone peroxides may be produced according to this process at a considerable saving in cost as compared to that of the processes known until the present time. Also, the ketone peroxide containing reaction products obtained by the process of the present invention possess ignition promoting characteristics markedly superior to those heretofore possessed by ketone peroxides produced by the known methods. Still another phase of the invention resides in the discovery that when an aliphatic ketone is reacted with products of partial combustion of aliphatic hydrocarbons in the presence of water and an acid, particularly sulfuric acid, at relatively low temperatures, besides the ketone peroxide, there also occurs a reaction between the products of partial combustion of the hydrocarbons and the sulfuric acid. This reaction forms a solid compound the exact composition and structure of which is not known at the present time, but which resembles a peroxide. This solid compound is soluble in liquid fuels for Diesel and semi-Diesel engines, and produces a marked rise in the cetane number of such fuel, particularly when it is added, even in small percentages, together with the ketone peroxides such as the peroxides produced by the present process.

Although the present process of preparing organic peroxides and/or mixtures containing the same may be practiced with a large number of aldehydes and aliphatic ketones, it is particularly adapted for the preparation of mixtures containing the peroxides of aliphatic ketones. The following are representative aliphatic ketones which may therefore be employed: acetone, methyl ethyl ketone, di-ethyl ketone, methyl isopropyl ketone, methyl secondary butyl ketone, methyl tertiary butyl ketone, and the like. As to typical aldehydes, reference may be made to formaldehyde, acetaldehyde, propionaldehyde, isobutylaldehyde, methyl ethyl acetaldehyde, trimethyl acetaldehyde, and the like, as well as the aromatic aldehydes such as benzaldehyde, toluic aldehydes, cuminol, naphthaldehyde, etc. Polyketonic and polyaldehydric compounds corresponding to the above may also be used, for example, diacetyl, acetyl propionyl, acetyl acetone, acetonyl acetyl acetone, glyoxal, succinic dialdehyde, mesoxalic dialdehyde, etc. The starting aldehydes and/or aliphatic ketones may be in the form of the chemical individuals, or mixtures thereof, or may be admixed with hydrocarbons or other materials which may be considered inert in the process. For example, the crude mixtures obtained in the preparation of ketones and/or aldehydes, such as the aldehyde and/or ketone containing mixtures resulting from the vapor phase oxidation of petroleum d the like, may be used. As pointed out above, if a given aliphatic ketone or aldehyde is employed as the starting material for the production of the organic peroxides according to the process of the present invention, the ketone or aldehyde peroxide, respectively, in the reaction product will be of the homopolymeric type. On the other hand, the use of mixtures of dissimilar ketones or aldehydes, or of a ketone with an aldehyde, results in the production of mixtures containing heteropolymeric organic peroxides.

The products of partial or incomplete combustion of hydrocarbons which are employed as one of the reactants in the present process, are obtained by contacting an aliphatic, saturated and/or unsaturated hydrocarbon with oxygen or an oxygen-containing substance under conditions whereby only incomplete combustion occurs. Suitable hydrocarbons which may be employed as a starting material are, for example, propane, butane, pentane, hexane, their homologues and analogues, the corresponding unsaturated hydrocarbons, such as propylene, butylene, and the like, and mixtures thereof. If desired, these hydrocarbons may be diluted with inert diluents, such as nitrogen, helium, etc. The operating conditions will vary with the stock treated, i. e., oxidized, the ratio of hydrocarbon to oxygen, the presence or absence of inert diluents, the type of oxidizing apparatus employed, etc. Usually, it is preferable to employ "Pyrex" glass reaction tubes which have been preliminarily cleaned as by flushing with hydrofluoric acid or hot nitric acid, followed by washing with distilled water. The reaction temperatures will also depend on the residence time, i. e., on the period of time during which the hydrocarbon is in contact with the oxygen at the elevated temperature. With a rise in reaction temperature, other conditions being equal, the yield of the desired oxidized hydrocarbons (which are termed herein as "alkyl peroxides" for reasons mentioned more fully hereinbelow) passes through a maximum, after which there is apparently an excess decomposition of the hydrocarbon to carbon monoxide. As will be pointed out below, good yields of "propane peroxides" are obtainable when propane gas and oxygen in a ratio of 60% to 40% by volume are reacted at an average temperature of 370° to 380° C. for a contact period of about 7 seconds. However, as noted, other operating conditions will vary this optimum temperature. For instance, with a mixture of propane gas, oxygen and nitrogen (as diluent) in a volumetric ratio of 1:1:2, and with a contact time of 36 seconds, optimum yields were obtained at a somewhat higher temperature of about 385° C. For a further and detailed discussion of a method for the preparation of these products of incomplete combustion of aliphatic hydrocarbons, or "alkyl peroxides," reference is made to the article "The slow oxidation of propane" by Pease and Munro, published in the Journal Amer. Chem. Society, vol. 56, pp. 2034–2038 (1934). It is stated therein that although the evidence is not conclusive to establish a definite formula for the reaction products of this incomplete combustion of hydrocarbons, it is considered that besides aldehydes, alcohols, etc., one of the main compounds formed is a peroxide having the general formula

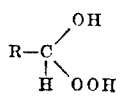

The reaction between the ketones and/or aldehydes is effected, according to the present process, in an acid medium, preferably by carrying out the oxidation of the ketones and/or aldehydes with the above-described alkyl peroxides in the presence of sulfuric acid and water. The concentration of sulfuric acid should preferably be from about 40% to 65% by weight of the mixture of the oxidizing agent (alkyl peroxides), water and sulfuric acid. In fact, these limitations of concentration of the sulfuric acid have been found to be quite critical. For example, with a sulfuric acid concentration of below 40% by weight, the reaction takes place very slowly thus making the process technically uneconomical, while the use of sulfuric acid concentrations of more than 65% by weight effects the formation of a large percentage of by-products, thereby decreasing the yield of the desired ketone and/or aldehyde peroxides. Also, the excessive heat generated under such operating conditions renders the process dangerous because of the possibility of an explosion of the reaction mixture. As noted, it is preferred to employ aqueous sulfuric acid solution. However, other mineral acids may also be used although the yields of ketone and/or aldehyde peroxides are not as high as when sulfuric acid is employed. Also, operating conditions may have to be somewhat changed. For example, when using hydrochloric acid in lieu of sulfuric acid, the temperature should be preferably maintained at or below about 0° C. Also, the use of hydrochloric acid favors the formation of chlorine-containing by-products which are separable only with great difficulty. Furthermore, the ketone and/or aldehyde peroxides prepared according to the present process, but with the use of hydrochloric acid instead of sulfuric acid, besides the relatively lower yields, are also comparatively less stable even when dissolved in a diluent, such as gas-oil, the solutions becoming darkened upon standing, and some cloudiness and precipitates being formed. Generally, the reaction should be effected at relatively low temperatures.

The reaction between the aliphatic ketones and/or aldehydes, or the like, on the one hand, and the alkyl peroxides described herein, on the other, when effected in accordance with the present invention in an aqueous sulfuric acid medium, is not one of simple formation of the ketone or aldehyde peroxides. Thus, as stated previously, it was found that there is also a concurrent reaction between the alkyl peroxide and the sulfuric acid to form a solid compound, soluble in liquid hydrocarbon fuels, such as gas-oil, and having the property of increasing the cetane number of such fuels. During the preparation of the ketone and/or aldehyde peroxides according to the present process, this reaction product of alkyl peroxides and sulfuric acid is constantly formed side by side with the ketone and/or aldehyde peroxides.

In carrying out the process of the present invention, it has been also found advantageous to employ an excess of the aliphatic ketone and/or aldehydes over the stoichiometric amount required to react with the alkyl peroxide. This ensures a more complete reaction of these products of partial or incomplete combustion of the hydrocarbons. Also, it prevents the further oxidation of the ketone and/or aldehyde peroxides.

Generally, it is preferable to remove the reaction products from the reaction medium substantially as soon as formed. Such removal inhibits and/or prevents certain undesirable side or secondary reactions. The removal of reaction products may be accomplished by conventional methods, as by centrifuging the reaction mixture, by extracting the resultant ketone and/or aldehyde peroxides from the mixture by solvents which are inert to the reaction mixture, or by dilution of the reaction mixture, for example with water. The dilution of the reaction product with water, however, is frequently disadvantageous since upon relatively long contact with water the ketone peroxides, or the like, become substantially hydrolyzed, so that the final yield of the desired peroxides is decreased.

When the reaction products resulting from the reaction of aliphatic ketones and/or aldehydes with the aforementioned "alkyl peroxides" in an aqueous sulfuric acid medium in accordance with the process of the present invention, are water insoluble, they may be, for example, recovered by filtration or by centrifugation. Such reaction products may also be recovered by extraction with suitable solvents such as ether, gasoline, benzene, gas oil, and the like, which are preferably inert with respect to other constituents of the reaction mixture. When using ketone and/or aldehyde peroxides for uses demanding a pure product, as for example, in the bleaching of flour and the like, volatile solvents such as gasoline, benzene, and the like, are preferably to be employed. These solvents may then be separately removed from the product by any of the well-known methods, such as distillation. However, when the product is to be employed under conditions wherein a high degree of purity is not absolutely necessary, as where the ketone peroxides and mixture containing same are used to improve the cetane numbers of Diesel engine or semi-Diesel engine fuels, it may be advantageous to employ relatively higher boiling solvents or extractants, such as the gas oil itself. For instance, a solution of the aliphatic ketone peroxide in such high boiling extractant may be used directly for blending with a liquid fuel for Diesel engines, it being unnecessary first to recover or separate such peroxide from the solvent. Also, such solutions of aliphatic ketone peroxides (and even of aldehyde or heteropolymeric peroxides) in the relatively high boiling solvents possess the added advantages since they may be safely stored and/or transported, it being known that peroxides of the class described are readily stabilized to prevent explosion by the addition thereto of between about 10% and 50% by weight of the final product, of a wetting agent such as gas oil or another hydrocarbon or hydrocarbon fraction boiling above about 100° C. Hydrocarbon fractions having a lower boiling point or range may also be used to stabilize the above peroxides. However, due to their volatility such higher fractions tend to create a fire hazard, so that the aforementioned fractions boiling above about 100° C. are preferred.

It has been stated above that the aliphatic ketone peroxides, the aldehyde peroxides, their mixtures, and mixtures containing these peroxides, may be produced by effecting the reaction between the ketones and/or aldehydes, in an acid medium, preferably in the presence of water and sulfuric acid, and the products of incomplete combustion of saturated or unsaturated aliphatic hydrocarbons. It was also brought out that the incomplete combustion of these hydrocarbons forms oxygenated hydrocarbons which are believed to be alkyl peroxides. In effecting the oxidation of the ketones and/or aldehydes according to the present process, it is possible to employ these "alkyl peroxides" or the total reaction product obtained as a result of the incomplete combustion of the aliphatic hydrocarbons. In the alternative, it is also possible to employ a concentrate rich in the "alkyl peroxides," this concentrate being obtainable, for example, by fractional condensation.

The process of the present invention may be executed batchwise, intermittently or continuously. The optimum concentrations of the sulfuric acid are, to a certain degree, different for each mode of operation. When using the conventional discontinuous or batch mode of operation, comparatively low concentrations of sulfuric acid appear to give the best results, the range of 50% to 55%, by weight, of sulfuric acid being preferable. On the other hand, when the process is effected in a continuous manner it appears that the use of comparatively higher concentration range (from about 55% to 65%, by weight) gives the best results. The continuous mode of operation is generally more efficient than the discontinuous or batch mode of operation since the former permits better temperature control and requires shorter contact times.

The aliphatic ketone peroxides formed in accordance with the aforementioned process are excellent addition products adapted to improve the ignition properties of Diesel fuels, these ignition properties being usually expressed by the cetane numbers of the fuels. Preferably, the aliphatic ketone peroxides suitable for increasing the cetane numbers of fuels should be prepared from aliphatic ketones having an average number of carbon atoms of not more than eight. However, in some cases ketones having a large number of carbon atoms per molecule, such as twelve, may be employed. The ketone peroxides formed are co-dimers and co-trimers. In other words, they are composed of at least two constituent ketone peroxides. These co-dimers and co-trimers may be either homopolymeric or heteropolymeric depending on whether a single ketone or a mixture of dissimilar ketones are employed as the starting material.

The aliphatic ketone peroxides are miscible in all proportions with most Diesel and semi-Diesel engine fuels, such as gas oil, solar oil, Edeleanu kerosene raffinate or extract, heavy pressure distillate and coal tar fractions. The quantities of the aliphatic ketone peroxides (prepared in accordance with the present process), or of the oil-soluble mixtures produced by the present process, to be added to the fuel depend on the kind and grade of the fuel oil to be improved, and on the magnitude of the effect which it is desired to produce. In general, small quantities of 5% or less, and more often of the order of 0.1% to 2%, are sufficient since these aliphatic ketone peroxides, as stated above, are very efficient in improving the cetane numbers of Diesel and semi-Diesel fuels, thereby promoting their ignition characteristics. Furthermore, as noted, the aliphatic ketone peroxide containing compounds prepared by reacting aliphatic ketones with the "alkyl peroxides" in the presence of water and sulfuric acid, contain the reaction products of the "alkyl peroxides" with the sulfuric acid, these products being miscible with the fuels, having the characteristics of increasing their cetane numbers, and, together with the aliphatic ketones formed, markedly improving the ignition properties of the Diesel or semi-Diesel fuels to which such compounds are added.

The following examples are presented to illustrate the method of realizing the present process and the advantages derived by the use of the compounds thus produced. The examples, however, are to be considered merely as illustrative of the invention and not as limiting the invention to any of the specific embodiments described therein.

*Example I*

A propane gas comprising propane and about 20% to 32% propylene, was commingled with oxygen in a volumetric ratio of about 3 to 2. This mixture was then conveyed at a rate of about 100 liters per hour through a "Pyrex" glass reaction tube 40 cm. long and 4 cm. in diameter. Before introducing the hydrocarbon-oxygen mixture, the reaction tube was first flushed with hydrofluoric acid and then washed with distilled water. During the reaction, the average temperature was in the neighborhood of about 370° C. The contact of residence time of the gases in the reaction tube was about 7.2 seconds. An analysis of the effluent gases indicated that the yield of "propane peroxides" was about 8.1% as calculated on the hydrocarbon gas introduced, and about 59% on the hydrocarbons consumed.

*Example II*

A solution of 73 parts, by weight, of acetone and 247 parts of gas oil was mixed at $-30°$ C. with 58 parts of propane peroxides (prepared according to the teachings of Example I), 134 parts of sulfuric acid and 76 parts of water. The concentration of the sulfuric acid was thus equal to 50% by weight of the propane peroxide, water and sulfuric acid mixture. The total mixture was stirred for half an hour while cooling. At the end of the reaction period, an additional 200 parts of gas oil were added. The mixture was then decanted to separate the oil layer from the aqueous phase. The former was then dried by filtration over sodium sulfate. A solution of 1.54% by weight of acetone peroxide in a hydrocarbon mixture predominating in gas oil was obtained. The yield of acetone peroxide was therefore 63% of the theoretical. The dehydrated oily mixture also contained some oil soluble reaction products of the propane peroxides with the sulfuric acid.

*Example III*

A Venezuela naphthene-base gas oil having a cetane number of 40, was mixed with about 1% by weight of acetone peroxide prepared by reacting acetone with hydrogen peroxide. The cetane number rose to 54. When the same gas oil was commingled with 1% by weight of the peroxides formed by reacting acetone in the presence of an aqueous sulfuric acid solution, with the products of incomplete combustion of propane, the cetane number of the resulting mixture was found to be equal to 61. In other words, the addition of 1% of the aliphatic ketone peroxide-containing mixture improved the ignition qualities of the fuel by 13% as compared with the ignition qualities of the gas oil containing the same quantity of acetone peroxides prepared according to the heretofore known process of reacting acetone with hydrogen peroxide.

*Example IV*

The gas-oil employed in the previous example was commingled with 0.4% by weight of acetone peroxide obtained by reacting acetone with hydrogen peroxide. The cetane number of the resulting fuel was 45.2. In another test, the products of incomplete combustion of propane gas (i. e. products obtained by treating the propane gas in accordance with the teachings of Example I) were reacted with sulfuric acid. The solid precipitate thus formed was then added to the aforementioned Venezuela gas oil in a quantity equal to 0.4% by weight of the gas oil. The solid precipitate was soluble in the gas oil. The cetane value of this fuel was found to be equal to about 48.7, or an increase of about 22% over the untreated gas oil, and of about 7.7% over the ignition value of the fuel containing the acetone peroxide.

I claim as my invention:

1. A process for producing an oil-soluble acetone peroxide containing mixture which comprises commingling acetone, products of the incomplete combustion of aliphatic hydrocarbons, water, and sulfuric acid in a concentration of between about 40% and 65% by weight of the mixture exclusive of the acetone, effecting reaction under acetone peroxide-forming conditions, and treating the reaction mixture with a hydrocarbon fraction to recover therefrom the oil-soluble acetone peroxide-containing compounds.

2. In a process for producing an oil-soluble aliphatic ketone peroxide-containing mixture, the steps of commingling products of the incomplete combustion of aliphatic hydrocarbons with an aliphatic ketone, effecting the interaction of said mixture at a sub-atmospheric temperature in the presence of an aqueous sulfuric acid solution, and extracting the reaction products thus produced to recover therefrom the oil-soluble aliphatic ketone peroxide-containing mixture.

3. The process according to claim 2 wherein the reaction is effected in the presence of an extractant, and wherein the separation of the extract phase is effected substantially as soon as the ketone peroxides are formed, thereby inhibiting undesirable side reactions.

4. In a process for producing aliphatic ketone peroxide-containing mixtures, the steps of commingling products of the incomplete combustion of aliphatic hydrocarbons with an aliphatic ketone, and effecting the interaction of said products with the ketone in the presence of water and sulfuric acid in a concentration of between about 40% and 65% by weight of the sulfuric acid, water and products of incomplete combustion employed.

5. In a process of producing aliphatic ketone peroxide-containing mixtures, the steps of commingling products of the incomplete combustion of aliphatic hydrocarbons with an aliphatic ketone, and effecting the interaction of said mixture in the presence of an aqueous sulfuric acid solution.

6. The process according to claim 5, wherein the aliphatic ketone peroxides are removed from the reaction mixture substantially as soon as formed.

7. In a process of producing aliphatic ketone peroxide-containing mixtures, the step of reacting a product of the incomplete combustion of hydrocarbons with an aliphatic ketone in an acid medium.

8. In a process of preparing organic peroxides, the step of reacting products of the incomplete combustion of hydrocarbons with an organic compound selected from the class consisting of aliphatic ketones and aldehydes in the presence of aqueous sulfuric acid.

9. The process according to claim 8 wherein the concentration of the sulfuric acid is between about 40% and 65% by weight of the sulfuric acid, water and the products of the incomplete combustion of the hydrocarbons.

10. In a process of preparing organic peroxides, the step of effecting a reaction, in an acid medium, between products of incomplete combustion of hydrocarbons and organic compounds selected from the class consisting of aliphatic ketones and aldehydes.

11. An aliphatic ketone peroxide resulting from the treatment of an aliphatic ketone with products of incomplete combustion of aliphatic hydrocarbons under peroxide-forming conditions.

12. An oil-soluble aliphatic ketone-peroxide-containing mixture obtainable according to the process of claim 2.

13. Oil-soluble acetone peroxide-containing product obtainable according to the process of claim 1, said product being capable of substantially raising the cetane number of compression ignition engine liquid fuels having poor ignition characteristics.

14. An aliphatic ketone-peroxide-containing mixture obtainable according to the process of claim 4.

15. An aliphatic ketone-peroxide-containing mixture obtainable according to the process of claim 5.

16. An aliphatic ketone peroxide resulting from the treatment, in an acid medium, of an aliphatic ketone with products of incomplete combustion of hydrocarbons.

17. Aliphatic ketone-peroxide-containing mixtures obtainable according to the process of claim 7.

18. Organic peroxides obtainable according to the process of claim 8.

19. Organic peroxides obtainable according to the process of claim 10.

HARCO JACOB TADEMA.